United States Patent
Hedlund

(10) Patent No.: US 10,071,331 B2
(45) Date of Patent: Sep. 11, 2018

(54) BACKING NET STRUCTURE

(71) Applicant: Camfil AB, Stockholm (SE)

(72) Inventor: Kenny Hedlund, Trosa (SE)

(73) Assignee: Camfil AB, Stockholm (SE)

( * ) Notice: Subject to any disclaimer, the term of this patent is extended or adjusted under 35 U.S.C. 154(b) by 439 days.

(21) Appl. No.: 14/427,609

(22) PCT Filed: Dec. 5, 2012

(86) PCT No.: PCT/EP2012/074546
§ 371 (c)(1),
(2) Date: Mar. 11, 2015

(87) PCT Pub. No.: WO2014/040658
PCT Pub. Date: Mar. 20, 2014

(65) Prior Publication Data
US 2015/0238891 A1    Aug. 27, 2015

(30) Foreign Application Priority Data

Sep. 12, 2012  (WO) ................ PCT/EP2012/067746
Sep. 21, 2012  (WO) ................ PCT/EP2012/068707

(51) Int. Cl.
*B01D 46/00* (2006.01)
*B01D 46/12* (2006.01)
*B01D 46/52* (2006.01)

(52) U.S. Cl.
CPC ....... *B01D 46/125* (2013.01); *B01D 46/0002* (2013.01); *B01D 46/0005* (2013.01);
(Continued)

(58) Field of Classification Search
None
See application file for complete search history.

(56) References Cited

U.S. PATENT DOCUMENTS 2,197,120 A * 4/1940 Bergmann ............. B01D 45/14
165/119
2,602,548 A * 7/1952 Griffiths ............... B01D 35/027
210/344

(Continued)

FOREIGN PATENT DOCUMENTS

CN    1668363 A    9/2005
CN    1679994 A    10/2005
(Continued)

OTHER PUBLICATIONS

International Search Report PCT/ISA/210 for International Application No. PCT/EP2012/074546 dated Feb. 7, 2013.
(Continued)

*Primary Examiner* — Amber Rose Orlando
*Assistant Examiner* — Britanny Precht
(74) *Attorney, Agent, or Firm* — Harness, Dickey & Pierce, P.L.C.

(57) ABSTRACT

The present invention relates to a backing net for a media pack. The backing net comprises a plurality of longitudinal beams and at least one vane and the longitudinal beam has first and second ends and is arranged to be mounted to the media pack in the longitudinal direction. The vane is attached to longitudinal beams and arranged to extend in the lateral direction of the media pack and adapted to direct an air flow passing through the backing net in a preferred direction. The invention further relates to a media pack with a backing net and a V-type filter having a plurality of media packs.

10 Claims, 7 Drawing Sheets

(52) U.S. Cl.
CPC ..... *B01D 46/0019* (2013.01); *B01D 46/0023* (2013.01); *B01D 46/0026* (2013.01); *B01D 46/0047* (2013.01); *B01D 46/521* (2013.01); *B01D 2201/0415* (2013.01); *B01D 2265/028* (2013.01); *B01D 2265/06* (2013.01); *B01D 2271/022* (2013.01); *Y10T 29/49826* (2015.01)

(56) References Cited

U.S. PATENT DOCUMENTS

| | | | | |
|---|---|---|---|---|
| 2,808,237 | A * | 10/1957 | Fosnes | F28D 1/024 |
| | | | | 126/299 D |
| 2,857,017 | A | 10/1958 | Nutting | |
| 2,965,933 | A * | 12/1960 | Kasten | B01D 29/111 |
| | | | | 264/257 |
| 3,470,680 | A * | 10/1969 | Avera | B01D 46/125 |
| | | | | 210/483 |
| 3,494,113 | A | 2/1970 | Kinney | |
| 4,364,751 | A | 12/1982 | Copley | |
| 4,483,769 | A * | 11/1984 | Sherman | A01K 63/045 |
| | | | | 119/259 |
| 4,732,675 | A | 3/1988 | Badolato et al. | |
| 5,240,487 | A * | 8/1993 | Kung | A61L 9/12 |
| | | | | 261/DIG. 88 |
| 5,487,767 | A | 1/1996 | Brown | |
| 5,512,074 | A | 4/1996 | Hanni et al. | |
| 5,525,145 | A * | 6/1996 | Hodge | B01D 46/001 |
| | | | | 454/309 |
| 5,584,988 | A | 12/1996 | Hashimoto et al. | |
| 5,597,392 | A * | 1/1997 | Hawkins | A61L 9/16 |
| | | | | 422/123 |
| 5,618,419 | A | 4/1997 | Fuerst | |
| 5,728,292 | A | 3/1998 | Hashimoto et al. | |
| 6,110,260 | A * | 8/2000 | Kubokawa | B01D 46/0086 |
| | | | | 96/26 |
| 6,248,155 | B1 | 6/2001 | Seaman | |
| 6,279,570 | B1 | 8/2001 | Mittelstadt et al. | |
| 6,294,004 | B1 * | 9/2001 | Summers | B03C 3/025 |
| | | | | 55/493 |
| 6,402,800 | B1 * | 6/2002 | Rey | B01D 29/21 |
| | | | | 210/493.1 |
| 6,447,566 | B1 | 9/2002 | Rivera et al. | |
| 6,485,538 | B1 | 11/2002 | Toyoshima | |
| 6,656,243 | B2 * | 12/2003 | Hodge | B01D 46/0036 |
| | | | | 55/418 |
| 6,955,696 | B1 | 10/2005 | Ost et al. | |
| 6,955,702 | B2 * | 10/2005 | Kubokawa | B01D 46/0005 |
| | | | | 55/357 |
| 7,048,035 | B2 * | 5/2006 | Farag | B60H 1/00028 |
| | | | | 138/39 |
| 7,425,274 | B1 * | 9/2008 | Helfet | A01K 63/045 |
| | | | | 210/151 |
| 7,789,928 | B2 * | 9/2010 | Stepp | B01D 46/10 |
| | | | | 454/309 |
| 8,110,099 | B2 * | 2/2012 | Hersey | B01D 35/147 |
| | | | | 210/121 |
| 8,142,537 | B2 * | 3/2012 | Braithwaite | B01D 46/10 |
| | | | | 55/497 |
| 8,887,719 | B2 * | 11/2014 | Billingsley | A62B 7/10 |
| | | | | 128/201.25 |
| 9,492,768 | B2 * | 11/2016 | Fick | B01D 29/118 |
| 2003/0085167 | A1 | 5/2003 | Fox et al. | |
| 2003/0145568 | A1 * | 8/2003 | Hodge | B01D 46/0036 |
| | | | | 55/418 |
| 2004/0074387 | A1 | 4/2004 | Jaisinghani | |
| 2004/0129629 | A1 * | 7/2004 | Malgorn | B01D 29/15 |
| | | | | 210/458 |
| 2004/0159598 | A1 | 8/2004 | Fox et al. | |
| 2004/0238434 | A1 | 12/2004 | Fisher et al. | |
| 2005/0023209 | A1 * | 2/2005 | Clausen | B01D 29/21 |
| | | | | 210/436 |
| 2005/0217488 | A1 | 10/2005 | Tanahashi et al. | |
| 2006/0150816 | A1 | 7/2006 | Jaisinghani | |
| 2006/0163121 | A1 | 7/2006 | Fisher et al. | |
| 2006/0180534 | A1 | 8/2006 | Fox et al. | |
| 2006/0231483 | A1 * | 10/2006 | Malgorn | B01D 29/15 |
| | | | | 210/483 |
| 2007/0187303 | A1 | 8/2007 | Fisher et al. | |
| 2007/0204577 | A1 | 9/2007 | Devine et al. | |
| 2007/0204578 | A1 | 9/2007 | Sundvik et al. | |
| 2008/0045135 | A1 | 2/2008 | Pfannenberg | |
| 2008/0078712 | A1 * | 4/2008 | Enokida | B01D 29/111 |
| | | | | 210/167.02 |
| 2009/0193773 | A1 | 8/2009 | Sundvik et al. | |
| 2010/0236203 | A1 | 9/2010 | Suzuki et al. | |
| 2010/0307118 | A1 | 12/2010 | Kawano et al. | |
| 2010/0313760 | A1 * | 12/2010 | Crabtree | B01D 39/1623 |
| | | | | 96/15 |
| 2011/0062065 | A1 * | 3/2011 | McCague | B01D 24/042 |
| | | | | 210/167.1 |
| 2011/0067368 | A1 | 3/2011 | Handley et al. | |
| 2012/0011817 | A1 | 1/2012 | Borkent et al. | |
| 2012/0055127 | A1 * | 3/2012 | Holzmann | B01D 46/0001 |
| | | | | 55/484 |
| 2012/0067013 | A1 * | 3/2012 | Antony | B01D 46/125 |
| | | | | 55/357 |
| 2012/0067323 | A1 | 3/2012 | Patwardhan et al. | |
| 2013/0067875 | A1 * | 3/2013 | Hartmann | B01D 46/0004 |
| | | | | 55/428 |
| 2013/0153173 | A1 * | 6/2013 | Nakamura | F24F 13/15 |
| | | | | 165/96 |
| 2014/0034565 | A1 | 2/2014 | Loken et al. | |
| 2014/0053634 | A1 * | 2/2014 | Woolard | G01N 15/082 |
| | | | | 73/38 |
| 2014/0096493 | A1 | 4/2014 | Kelmartin et al. | |
| 2014/0373493 | A1 * | 12/2014 | Cannon | F24F 13/28 |
| | | | | 55/490.1 |
| 2015/0075125 | A1 | 3/2015 | Porbeni et al. | |
| 2015/0202560 | A1 * | 7/2015 | Jarrier | B01D 46/023 |
| | | | | 55/378 |
| 2015/0224433 | A1 * | 8/2015 | Lans | B01D 46/0005 |
| | | | | 55/482 |
| 2015/0290573 | A1 * | 10/2015 | Hugert | B01D 46/0026 |
| | | | | 55/484 |
| 2015/0336034 | A1 * | 11/2015 | Carrion | B01D 29/56 |
| | | | | 210/774 |
| 2016/0076497 | A1 * | 3/2016 | Jokschas | B01D 35/153 |
| | | | | 210/136 |
| 2017/0050136 | A1 * | 2/2017 | Poon | B01D 46/0005 |
| 2017/0282107 | A1 | 10/2017 | Hugues | |
| 2018/0117515 | A1 | 5/2018 | Hugues | |

FOREIGN PATENT DOCUMENTS

| | | |
|---|---|---|
| CN | 101229463 A | 7/2008 |
| CN | 101234276 A | 8/2008 |
| CN | 202398240 U | 8/2008 |
| CN | 201461157 U | 5/2010 |
| CN | 101868291 A | 10/2010 |
| DE | 2739815 A1 | 9/1978 |
| DE | 20002124 U1 | 4/2000 |
| DE | 102010016504 A1 | 10/2011 |
| EP | 0082106 A2 | 6/1983 |
| EP | 1582248 A1 | 10/2005 |
| GB | 2364256 A | 1/2002 |
| JP | H06262020 A | 9/1994 |
| JP | 2008253886 A | 10/2008 |
| WO | WO-0051712 A1 | 9/2000 |
| WO | WO-0197946 A1 | 12/2001 |
| WO | WO-200197946 A1 | 12/2001 |
| WO | WO-03013690 A1 | 2/2003 |
| WO | WO-2004069374 A1 | 8/2004 |
| WO | WO-2008001396 A1 | 1/2008 |
| WO | WO-2010151542 A2 | 12/2010 |
| WO | WO-2010151580 A1 | 12/2010 |

OTHER PUBLICATIONS

Chinese Office Action dated Dec. 3, 2015 issued in corresponding Chinese Application No. 201280075771.6 (with translation).

(56) References Cited

OTHER PUBLICATIONS

Chinese Search Report dated Nov. 10, 2015 issued in corresponding Chinese Application No. 201280075771.6.
Chinese Office Action dated Dec. 3, 2015 issued in corresponding Chinese Application No. 201280075763.1 (with translation).
Chinese Suppl. Search Report dated Aug. 5, 2016 issued in corresponding Chinese Application No. 201280075763.1.
Second Chinese Office Action dated Sep. 2, 2016 issued in corresponding Chinese Application No. 201280075763.1 (with translation).
Chinese Search Report dated Nov. 17, 2015 issued in corresponding Chinese Application No. 201280075763.1.
U.S. Office Action dated Oct. 4, 2016 issued in co-pending U.S. Appl. No. 14/427,522.
U.S. Office Action dated Oct. 6, 2016 issued in co-pending U.S. Appl. No. 14/427,584.
U.S. Office Action dated Nov. 4, 2016 issued in co-pending U.S. Appl. No. 14/427,392.
Office Action for U.S. Appl. No. 14/427,605 dated Oct. 13, 2017.
Office Action for corresponding U.S. Appl. No. 14/427,605 dated May 17, 2018.

* cited by examiner

BACKING NET STRUCTURE

CROSS-REFERENCE TO RELATED APPLICATIONS

This is a National Phase Application of PCT/EP2012/067746 filed Sep. 12, 2012, and PCT/EP2012/068707 filed Sep. 21, 2015 the entire contents of which is hereby incorporated by reference.

FIELD OF THE INVENTION

The present invention relates to filter assemblies for removing particles from an air flow, and more particularly to a backing net structure for a media pack, in particular for a media pack comprising a pleated filter media in a V-type arrangement.

BACKGROUND OF THE INVENTION

Filter assemblies comprising pleated media packs disposed in a frame structure are known. A pleated filter pack is typically formed from a sheet of filter media, e.g. a fiberglass sheet, or a nonwoven polyester sheet, which is pleated to increase the effective filtering area of the filter body. To provide mechanical support and/or to combine a plurality of media packs, the media pack is typically arranged in a frame structure, such as a frame having a V-type arrangement. In order to enhance the physical properties of pleated filter media, it is known to provide different types of support elements thereto such that deflection during use of the filter media can be reduced. Deflection can in a worst case scenario lead to a break of the filter media. But even if it does not come to a breakage of the filter media, deflection thereof causes adjacent media packs to come closer to each other or even come in contact. Both events lead to an increase in pressure drop over the filter since the air cannot flow as intended through there. One example of support is shown in WO-2010/151542 where a flexible but inextensible scrim is attached to a downstream surface of a filter media. While the use of such scrim has advantages over the use of a filter media with no backing at all and prevents deformation of the filter media to a certain extent, it still has some disadvantages. For example, since the scrim is attached to the pleats of the filter media itself, the forces acting on the scrim will be transferred to these pleats which, if it comes to the worst case, may burst thus ruining the filter media.

SUMMARY OF THE INVENTION

It is an object of the present invention to provide an improved backing net which reduces or eliminates the above mentioned and other drawbacks. This object and other objects are achieved by a backing net according to the present invention as defined in claim 1 of the appended claims. This object and other objects are also achieved by a media pack as defined in claim 10 and a V-type filter as defined in claim 11 of the appended claims. Preferred embodiments of the present invention are defined in the dependent claims.

Thus, in accordance with an aspect of the present invention there is provided a backing net for a media pack, where the backing net has a longitudinal direction arranged to extend along an in depth length of the media pack, i.e. in the direction of the air flow, and a lateral direction, i.e. a direction substantially perpendicular to the longitudinal direction, arranged to extend along a width of the media pack. The backing net comprises a plurality of longitudinal beams that have first and second ends and arranged to be mounted to the media pack in the longitudinal direction. The backing net further comprises at least one vane which is attached to longitudinal beams and arranged to extend in the lateral direction of the media pack and adapted to direct an air flow passing through the backing net in a preferred direction. The provision of a vane does not only increase rigidity of the system, it also provides a better guidance of the air flow passing through the filter and the backing net in comparison with prior art solutions. This increases the air flow properties of a filter. Further, by using a backing net according to the invention deflection of the media pack is reduced due to the added rigidity of the backing net in comparison with prior art solutions. This allows for the use of filter media packs having a greater in-depth length, that is the length of the media pack in the direction of the air flow, which reduces pressure drop over the filter at a given flow rate. Further, this rigidity allow the use of media packs having a reduced thickness. This reduces the amount of dead area, i.e. areas where the air flow cannot pass through. All in all, by using a backing net according to the present invention, filter arrangements can be obtained with improved filtering characteristics, reduced pressure drop and increased life time expectancy.

In accordance with an embodiment of the invention, the vane is provided in form of vane elements arranged in gaps between adjacent longitudinal beams.

In accordance with an embodiment of the invention, a plurality of laterally extending vanes are provided.

In accordance with an embodiment of the invention, the dimensions of the separate vanes differs. By using vanes having different sizes at different locations of the backing net, the properties can be optimized. For example, vanes near a central part of the backing net may have larger dimensions than vanes located near a downstream edge. Near an up-stream edge of the backing net, a vane having relatively large dimensions may nevertheless be used in order to function as a touch guard, i.e. provide protection for the filter media pack against intrusion of e.g. a users hands or fingers. This is advantageous since it often happens that a user, when e.g. assembling a filter frame assembly or mounting a filter frame assembly to a filter bank grid or similar, accidently pushes her or his fingers through the filter media pack, possibly spoiling it. A vane having a relatively large chord length avoids this and in addition it also guides an air flow in a suitable direction.

In accordance with an embodiment of the invention, the vane has a flat shape. A vane near an up-stream edge of the backing net may for example have a flat shape, acting both as air flow guidance and as a touch guard.

In accordance with an embodiment of the invention, the vane has a curved shape. An air flow entering a V-type filter frame assembly comprising a pleated filter media will pass through the filter media itself at a direction more or less perpendicular to the main surface of the filter media pack. As the air then exits the filter media pack, it changes its flow direction into the overall flow direction. A curved vane can be made with an up-stream starting point, i.e. closest to the filter media pack, having a relatively steep angle, i.e. perpendicular to the filter media pack, or at least close thereto. Immediately thereafter, the curvature of the vane can turn towards the preferred flow direction. The curvature secures that the air flow can be re-directed without unnecessary pressure drop.

In accordance with an embodiment of the invention, no point of the vane has a greater height than the height of the beam at the same in depth position. By avoiding that the vanes add to the overall height of the backing net in addition to the longitudinal beams, the combined thickness of filter media pack and backing net can be reduced, thereby reducing overall dimensions.

In accordance with an embodiment of the invention, the vane has a curved shape such that the angle between the normal to a principal plane of the backing net and a straight, imaginary line between the vane starting point and any point on the vane is smaller or equal to the angle between the normal of the principal plane of the backing net and a straight, imaginary line connecting the starting point and the end point of the vane. The starting point being the up-stream end point of the vane and the end point being the down-stream end point of the vane.

In accordance with an embodiment of the invention, an angle $\varphi$ between the normal of the principal plane of the backing net and a straight, imaginary line connecting the starting point and the end point of the vane lies between 0° and 90°.

In accordance with an embodiment of the invention, at least a partial surface of the vane has a surface roughness which delays flow separation of an air flow passing through the backing net. Flow separation of the air flow is highly undesirable since it significantly increases pressure drop. By providing at least parts of the vane with a surface roughness adapted to induce a turbulent flow in the boundary layer, the risk of flow separation can be greatly reduced. This since turbulent flow is much less prone to separation in comparison with a laminar flow. This can be achieved by the provision of dimples (cf. golf balls) over the surface of the upper part, i.e. down-stream surface, of the vane. Of course, other parts of the backing net, such as the longitudinal beams could also be provided with such surface roughness. Instead of depressions, such as dimples, protrusions are also conceivable.

In accordance with another aspect of the invention, a media pack for a V-type filter is provided, where the media pack has an up-stream surface and a down-stream surface and wherein a backing net according to any of claims 1-10 is provided on the down-stream surface of the media pack.

In accordance with another aspect of the invention, a V-type filter comprising a plurality of media packs according to claim 10 arranged in a V-type manner is provided, where the V-type filter comprises a frame structure and wherein the media pack is attached to said frame structure.

In accordance with an embodiment of the invention, an angle $\varphi$ between the normal of the principal plane of the backing net and a straight, imaginary line connecting the starting point and the end point of the vane is $\alpha<\varphi<90°$, where $\alpha$ is half the opening angle of the V-shape.

In accordance with an embodiment of the invention, an angle $\varphi$ between the normal of the principal plane of the backing net and a straight, imaginary line connecting the starting point and the end point of the vane is $2*\alpha<\varphi<90°$, where $\alpha$ is half the opening angle of the V-shape and $\alpha<45°$.

In accordance with an embodiment of the invention, an angle $\varphi$ between the normal of the principal plane of the backing net and a straight, imaginary line connecting the starting point and the end point of the vane is $3*\alpha<\varphi<90°$, where $\alpha$ is half the opening angle of the V-shape and $\alpha<30°$.

In accordance with an embodiment of the invention, an angle $\varphi$ between the normal of the principal plane of the backing net and a straight, imaginary line connecting the starting point and the end point of the vane is $\alpha<\varphi<90°-\alpha$, where $\alpha$ is half the opening angle of the V-shape and where $\alpha<45°$.

In accordance with an embodiment of the invention, the dimensions and shapes of the backing net are chosen such that the backing net does not form a restriction of the air flow through the filter in addition to the filter media.

BRIEF DESCRIPTION OF THE DRAWINGS

The invention will now be described in more detail and with reference to the appended drawings in which.

DESCRIPTION OF PREFERRED EMBODIMENTS

Figure 1:
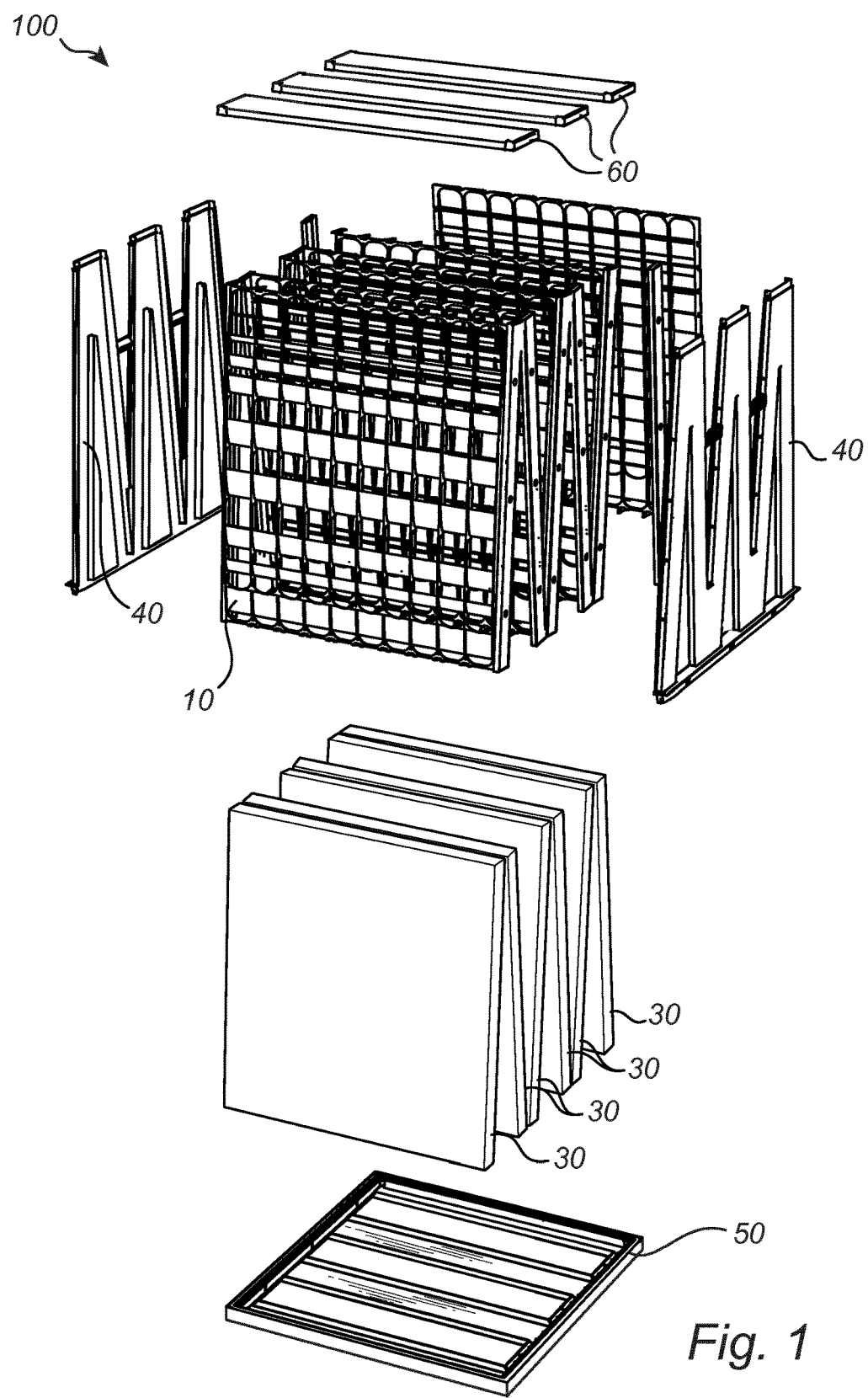
FIG. 1 is a schematic exploded perspective view of an embodiment of a V-type filter of the invention.
Figure 2:
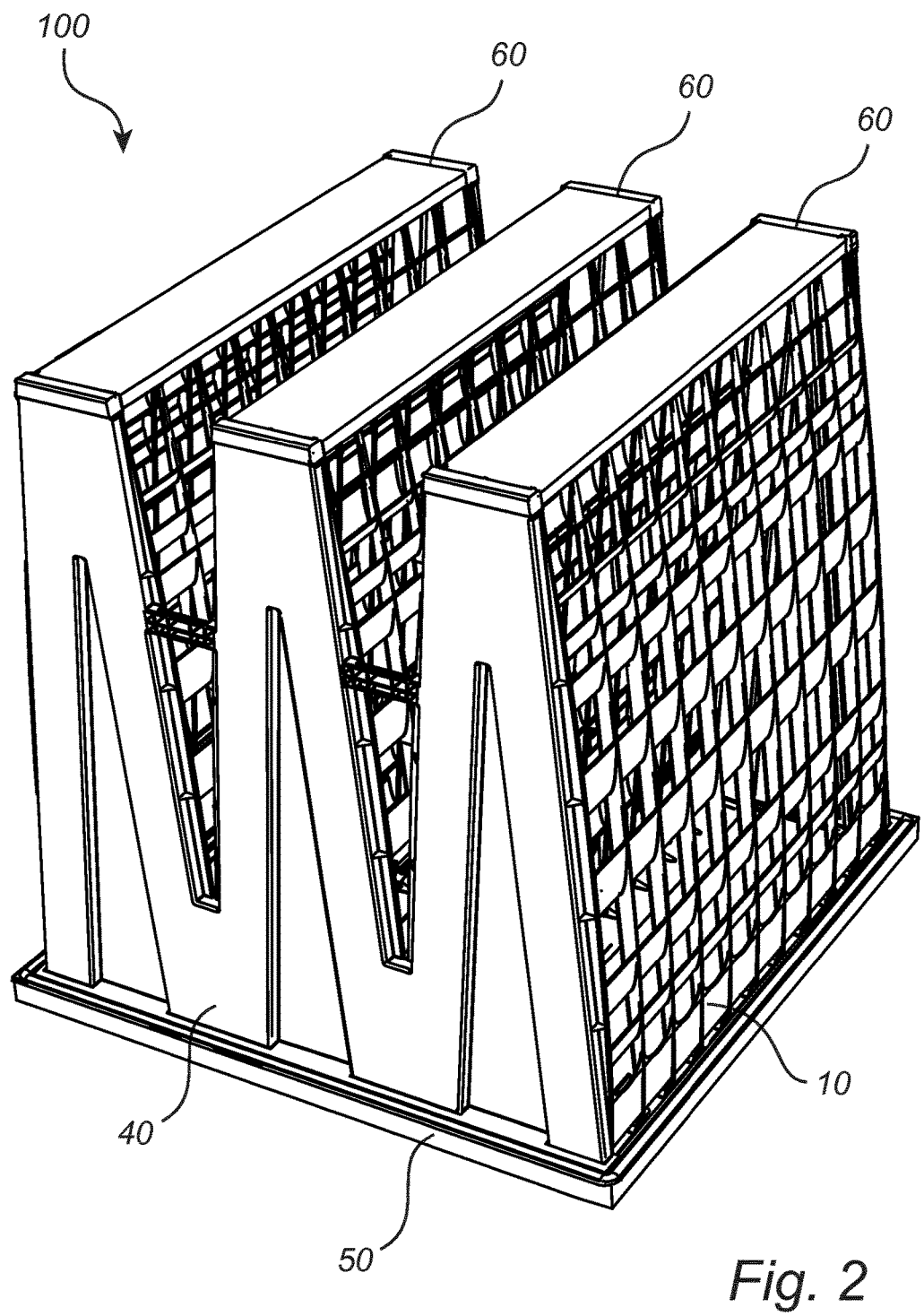
FIG. 2 is a schematic perspective view of an embodiment of a V-type filter of the invention.

The present invention relates to a backing net in filter assemblies for removing particles from an air flow, and more particularly to a backing net structure for a pleated filter media in a V-type arrangement as shown in FIG. 1. Shown therein is an exploded view of an embodiment of a filter assembly 100 of the present invention. The filter assembly 100 includes a frame structure having six media packs 30 arranged therein. The media packs 30 comprises a rectangular pleated media, having opposing first and second side edges, and opposing front and rear edges. The media pack is fabricated from a sheet of filter media, made of e.g. a fiberglass sheet, or a nonwoven polyester sheet, which is pleated to increase the effective filtering area of the filter body. The filter assembly 100 is here a frame structure comprising a plurality of frame elements: side panels 40, a top panel 50, and three bottom panels 60. The media packs 30 are stacked in a repeated V-structure within the frame structure, having their opposite side edges arranged facing a respective side panel 40, while at least one of the front and rear ends of each stacked media pack 30 bares against a corresponding front or rear end of an adjacent media pack 30 to form the V-structure. The opposite front and rear ends of the media pack 30 are arranged facing the top panel 50 and one of the bottom panels 60, respectively. Further, when the filter assembly 100 is mounted, the side edges and the front and rear ends of the media pack 30 are sealed against the frame elements 40, 50, 60 of the frame structure, such that substantially all of the air passing through the filter assembly will pass through the media pack 30. Typically the air enters the filter assembly 100 via the top panel 50 in a direction perpendicular thereto and exits the filter assembly 100 at the bottom panels 60 in the same direction such that the general air flow direction is a direction perpendicular to a principal plane of the top panel 50.

Figure 3:
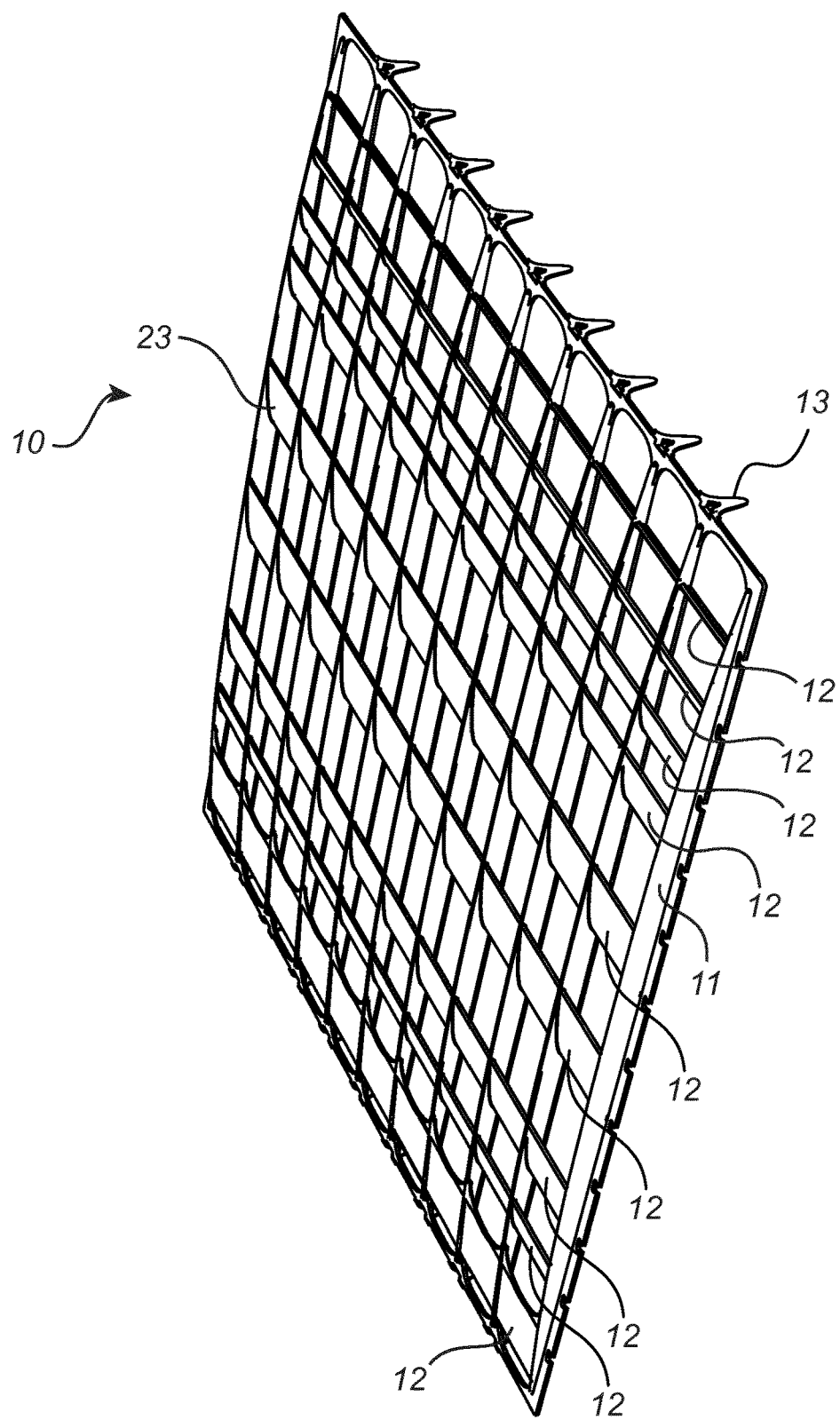
FIG. 3 is a perspective view of an embodiment of the backing net according to the invention.
Figure 4:
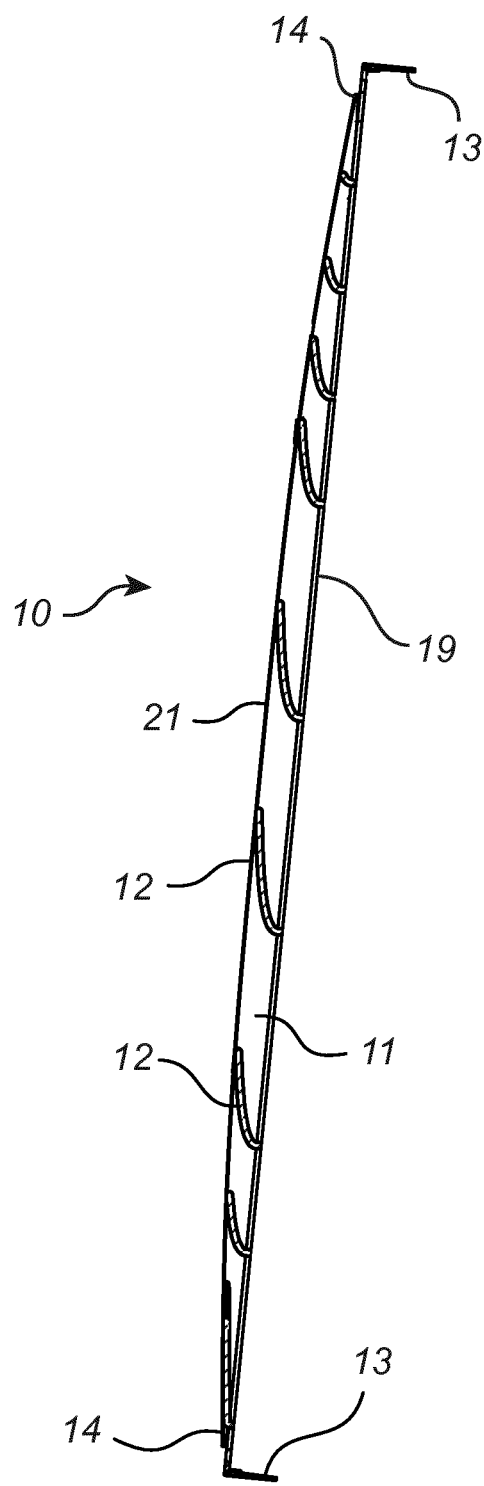
FIG. 4 is a schematic side view of an embodiment of the backing net according to the invention.
Figure 5:
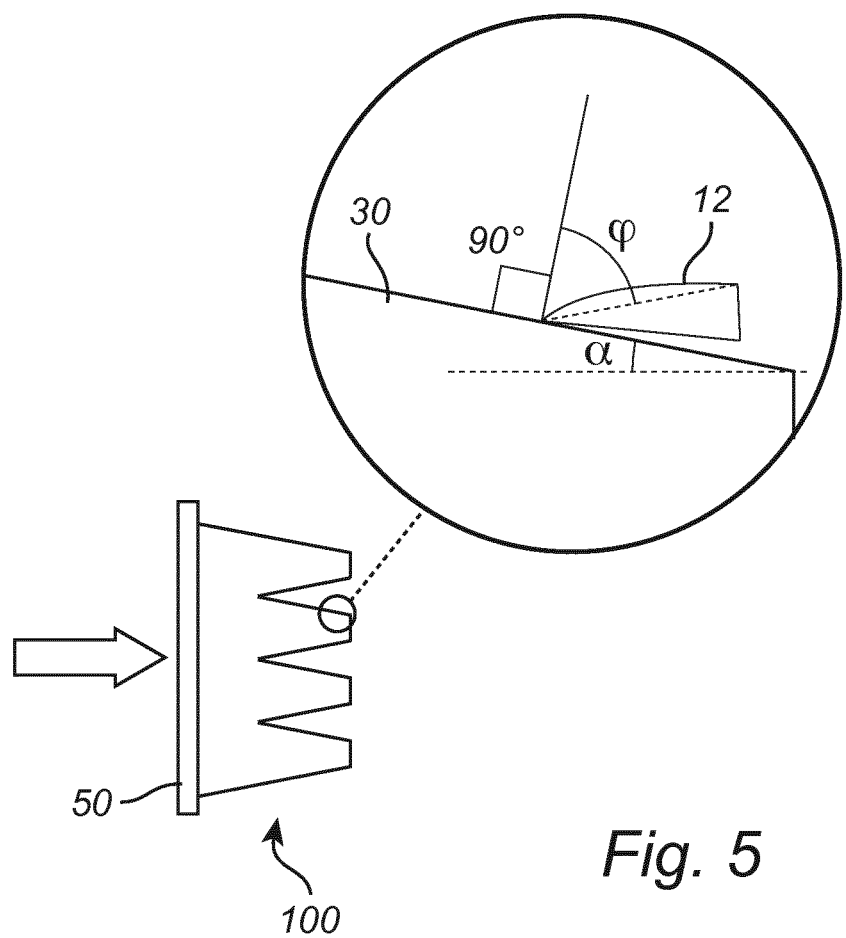
FIG. 5 is a schematic explanatory view of the invention.
Figure 6:
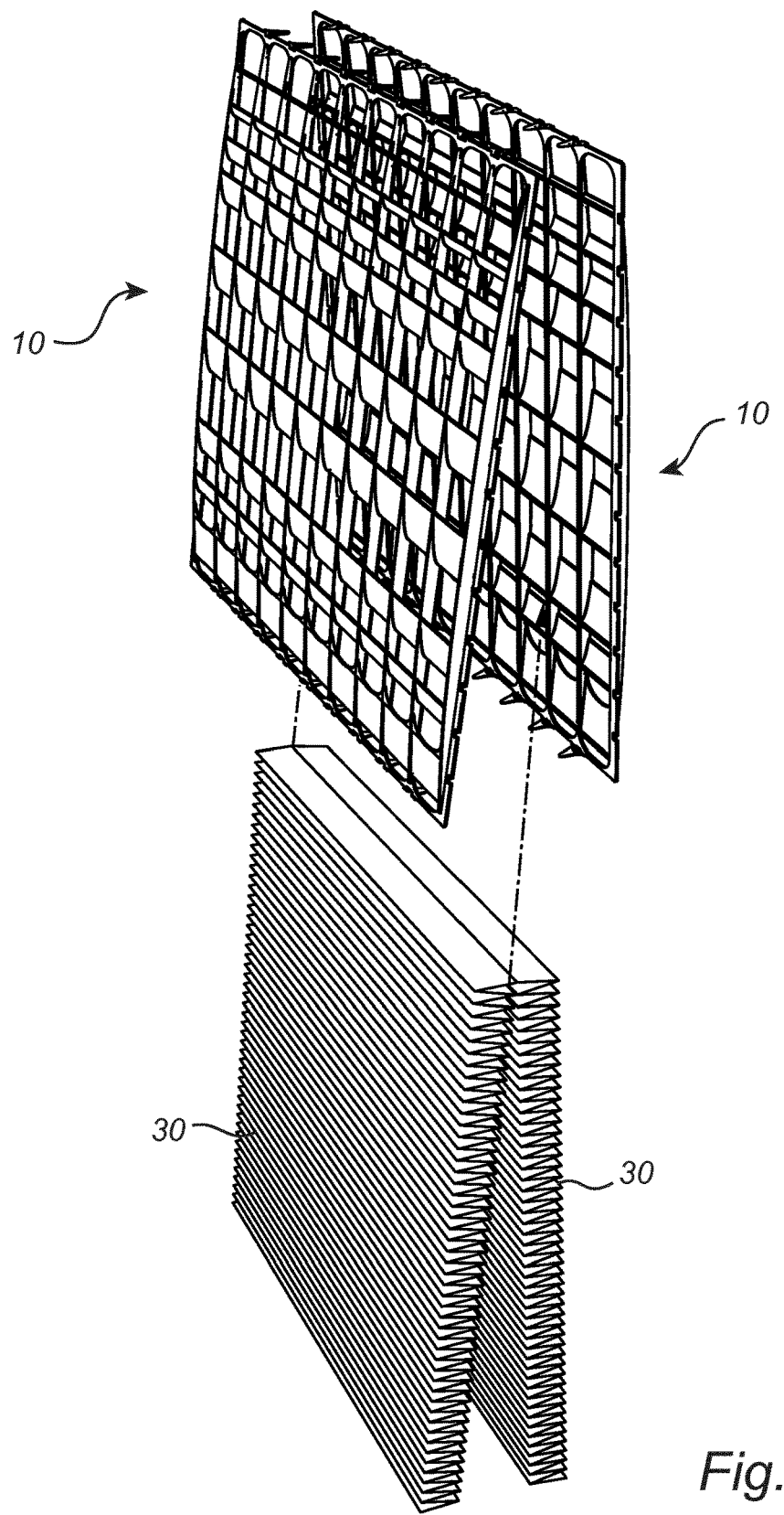
FIG. 6 is a schematic perspective view of an embodiment of the invention.

In a first embodiment of a backing net according to the invention, as shown best in FIGS. 3, 4 and 6, a backing net 10 comprises a number of longitudinal beams 11 and vanes 12. In contrast to the backing nets of the prior art, the longitudinal beams 11 according to the present invention have a height that varies over their length and vanes 12 are provided that guide the air having passed through the filter media in a preferred direction while providing additional strength to the net. Furthermore, the outermost longitudinal beams each have a lateral rib protruding outwardly. This lateral rib is provided with dovetail slots in order to increase an adhesive bond between the backing net 10 and the filter frame structure. Thereby a backing net 10 is obtained that possesses a high degree of rigidity, especially against deflection. A backing net of this type may have to endure pressures of about 6000-6500 Pa, which for a net being 550*600 mm will be equivalent with a load of up to 210 kg. Therefore, in order to avoid that adjacent filter media packs 30 deflect and come too close to each other such that air flow is impeded or even come to break, the backing net 10 need to be as rigid as possible. But at the same time, the combined thickness of media pack 30 and backing net 10 at the front and rear edges, i.e. where adjacent media pack 30 and backing nets 10 come into contact with each other and the top and bottom panels 50, 60 respectively, should be kept as low as possible. This since the area of the bottom panels 60 and the corresponding parts of top panel 50 can be regarded as dead, or restricting, areas when it comes to air flow characteristics. In order to reduce pressure drop over the filter assembly these areas are to be minimized. Therefore, the reduced height at the ends of the longitudinal beams 10 of the present invention is very favorable in this respect. Further details as to the beams can be found in PCT/EP2012/068707 from which priority is sought for this application. The vanes 12 of the present invention are arranged in the gaps between adjacent longitudinal beams and do not add to the overall height of the backing net in addition to the longitudinal beams. This is best shown in FIG. 4 where it is indicated how the vanes 12 are arranged in the gap between two adjacent longitudinal beams 11 while not adding anything to the overall height of the backing net 10. FIG. 4 also shows the curvature of the vanes 12, the importance of which will now be discussed. An air flow entering a filter frame assembly comprising a pleated filter media, in this case a V-type filter frame assembly, enters and exits the filter assembly in a direction generally perpendicular to the principal plane of top panel 50. The air flow will, however, pass through the filter media itself at a direction more or less perpendicular to the main surface of the filter media pack, thus having to change direction when doing so. As the air then exits the filter media pack, it again changes its flow direction, this time back to the overall flow direction. A curved vane can be therefore made with an up-stream starting point, i.e. closest to the filter media pack, having a relatively steep angle, i.e. perpendicular to the filter media pack and thus more or less the same as the air leaving the filter media, or at least close thereto. Immediately thereafter, the curvature of the vane can turn the air flow towards the preferred flow direction. Such curvature secures that the air flow can be re-directed without unnecessary pressure drop. Such vane 12 can be seen in FIG. 4 where it starts at an up-stream position, near a lower edge 19 of the backing net 10 intended to bear against a downstream surface of a filter media pack 30. It starts in a direction substantially perpendicular to a main surface of the backing net 30, and thus to a main surface of media pack 30, and thereafter smoothly turns towards a direction substantially parallel to the general air flow direction when it reaches the upper edge 21 of the backing net 10. In a preferred embodiment, a tangent of a down-stream end of vane 12 lies in the plane of the general air flow direction. The smooth transition in vane direction secures a change of air flow direction with no, or at least very small, additional pressure drop. FIG. 5 shows in an explanatory and simplified manner the shape of the curved vane 12. Here it is shown angle $\alpha$, which is half the opening angle between two adjacent V-structures; and $\varphi$ which is the angle between the normal of the principal plane of the backing net, and thus to the principal plane of the media pack 30, and a straight, imaginary line connecting the starting point and the end point of the vane 12. In order for air to be able to leave the filter assembly without an undue pressure drop, $\varphi$ should fulfill $0°<\varphi<90°$, where $\varphi$ being positive in the downstream direction. A preferred curvature of the vane 12 can be described by stating that the vane 12 has a curved shape such that the angle between the normal to a principal plane of the backing net 10 and a line between the vane starting point and any point on the vane is smaller or equal to the angle between the normal of the principal plane of the backing net 10 and a straight, imaginary line connecting the starting point and the end point of the vane.

The side view of the longitudinal beam 11 is also shown in FIG. 4. Here it can be seen that the longitudinal beam 11 has an arc shaped upper side which gives the longitudinal beam 11 the favorable characteristics, i.e. high flexural rigidity while still contributing to a low total thickness at the front and rear edges of the media pack 30. The arc-shaped upper side of the longitudinal beam 10 ends abruptly near the front and rear edges of backing net 10, thus creating an abutting surface 14. This abutting surface 14 provides for additional structural rigidity of the backing net 10 when inserted into top and bottom panels 50, 60 respectively. Top and bottom panels 50, 60 typically comprises a recess or similar into which the media pack 30 together with backing net 10 is inserted. This recess is subsequently filled with an adhesive in order to create a strong and air tight bond between the separate elements. The abutting surface 14 will then abut a corresponding surface of the top or bottom panel 50, 60 thus enhancing the rigidity of the system. Of course the adhesive can be provided into the recess prior to insertion of the media pack 30 with backing net 10 as well. Of course, other shapes of longitudinal beams 11 are also conceivable, for example a step-by-step increase in height or a linear increase in height.

Along front and rear edges of the backing net 10, downwardly protruding tabs 13 are provided. These have substantially two functions. Firstly, they allow for the backing net 10 to be temporarily attached to a corresponding media pack 30. The tabs 13 will clasp around the edges of the media pack 30 such that the media pack 30 and the backing net 10 jointly can be attached to the filter frame assembly in a subsequent step. Secondly, the tabs 13 allow for backing nets 10 to be stacked and held in place one on top of the other which is advantageous during transportation and stock keeping.

Figure 7:
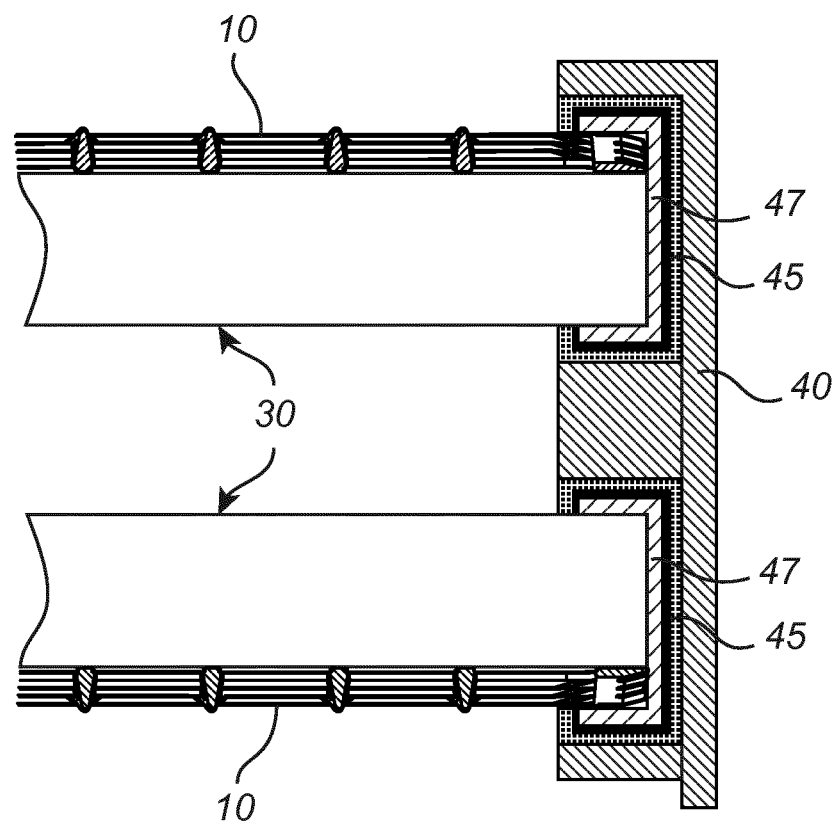
FIG. 7 is a schematic cross-sectional view of a detail of a V-type filter according to the invention.

FIG. 7 shows a cross section of a filter assembly as illustrated in FIG. 1 in which two media pack 30 are arranged in a frame element, here side panel 40. The filter medias are before being emerged in a pot 45 in a first molding step, provided with a backing net 10. The backing net 10 and the media pack 30 are temporarily held together by means of tabs 13, not shown herein. The backing net 10 and media pack 30 are emerged together into the first molding compound layer 47, and subsequently fixated and sealed within the pot 45. The ribs extending along the lateral edges of the backing net 10 are therby sealed in the pot 45 together with the media pack 30 in this first molding step. The provision of the pot 45 further increases the structural rigidity of the media pack 30 and backing net 10 which facilitates the insertion thereof the thus created media packs into the filter frame assembly, i.e. side panel 40, top panel 50 and bottom panel 60. In a second molding step, the media pack 30, backing net 10 and pot 45 are jointly inserted and attached to the filter frame assembly comprising the top panel 50 and side panels 40. When the media pack 30, backing net 10 and pot 45 have been inserted, bottom panels 60 are attached to the side panels 40. Preferably the molding compound used in the first 47 and/or second 46 molding step is selected from suitable single or multi-component materials which can be dispensed as a liquid and subsequently be hardened, i.e. cured, such as a material chosen from a group consisting of polyvinylchloride plastisols, polyurethanes, epoxies, silicones and ceramics. Further details concerning the arrangement of pot 45 can be found in PCT/EP2012/067746 from which priority is sought for this application.

Finally, it is realized that the backing net using longitudinal beams having a varying height over the length thereof and vanes for directing the air flow uses the advantages of having both a thin backing net at the edges thereof for reducing pressure losses over the filter due to dead areas and a more rigid backing net towards a central portion thereof for reducing deflection of the filter media during use. This allows for the use of filter media packs having a greater in-depth length than in prior art solutions. Instead of using filters of e.g. 300 mm or 450 mm length, it is now possible to use filters having a in-depth length of 600 mm. This greatly reduces pressure drop over the filter at a given flow rate. By using a backing net according to the present invention it may even be possible to replace two filter frame assemblies coupled in series with one single assembly, which implies lower maintenance times and thus reduced costs. The net and the other filter frame details may be manufactured from a number of materials such as plastic or metal. Preferably, all parts of the filter frame assembly may be made from ABS, except for the backing net which could be made from reinforced (glass fibers) ABS. Other materials are also conceivable, such as polystyrene, polypropylene etc. Furthermore, it is obvious that the vanes does not necessarily have to be curved. They may just as well be flat and still attain the advantages mentioned herein, i.e. air flow direction and improved net rigidity. It is not necessary that all longitudinal beams have a varying height along its length. For example, the two outermost longitudinal beams may comprise a substantially flat rib extending along a lateral edge of the filter media. The outermost beams are typically not subject to the same forces as the beams towards the central portion of the backing net and do therefore not have to be as rigid as beams. Since the backing net is attached to the filter frame structure along the lateral edges, the forces are to a high degree carried by the filter frame. The flat rib may also be provided with dovetail slots similar to what is stated above. Further, the V-type filter of the present invention may in use be located with a principal plane of the side plates lying in any plane, such as a horizontal plane or in a vertical plane such that the bottom of the V-shape can be aligned in any preferred direction.

The invention claimed is:

1. A backing net configured to be arranged on a downstream surface of a filter media pack of a V-type filter, wherein the backing net has a longitudinal direction extending along an in-depth length of the filter media pack of the V-type filter and a lateral direction extending along a width of the filter media pack of the V-type filter, the backing net comprising:
    a plurality of longitudinal beams, each longitudinal beam of the plurality of longitudinal beams having first and second ends and configured to be mounted to the filter media pack of the V-type filter in the longitudinal direction extending along the in-depth length of the filter media pack of the V-type filter; and
    at least one vane, wherein the at least one vane is attached to the plurality of longitudinal beams and is arranged to extend in the lateral direction extending along the width of the filter media pack of the V-type filter, wherein the at least one vane is configured to direct an air flow passing through the backing net in a particular direction.

2. The backing net according to claim 1, wherein the at least one vane includes one or more vane elements arranged in gaps between adjacent longitudinal beams of the plurality of longitudinal beams.

3. The backing net according to claim 1, wherein the at least one vane includes a plurality of laterally extending vanes.

4. The backing net according to claim 3, wherein separate vanes of the plurality of laterally extending vanes have different dimensions.

5. The backing net according to claim 1, wherein the at least one vane has a flat shape.

6. The backing net according to claim 1, wherein the at least one vane has a curved shape.

7. The backing net according to claim 1, wherein no point of the at least one vane has a greater height than a height of each longitudinal beam of the plurality of longitudinal beams at a common in-depth position.

8. The backing net according to claim 1, wherein the at least one vane has a curved shape such that an angle between a normal to a principal plane of the backing net and a line between a starting point of the at least one vane and any point on the at least one vane is smaller than or equal to an angle between the normal of the principal plane of the backing net and a straight, imaginary line connecting the starting point of the at least one vane and an end point of the at least one vane.

9. The backing net according to claim 1, wherein an angle φ between a normal of a principal plane of the backing net and a straight, imaginary line connecting a starting point of the at least one vane and an end point of the at least one vane lies between 0° and 90°.

10. The backing net according to claim 1, wherein at least a partial surface of the at least one vane has a surface roughness which delays flow separation of the air flow passing through the backing net.

* * * * *